US008235006B2

(12) United States Patent
Lipscomb et al.

(10) Patent No.: US 8,235,006 B2
(45) Date of Patent: Aug. 7, 2012

(54) DISPOSABLE FOLD-UP SIFTING ANIMAL LITTER FILTERING PAN

(75) Inventors: John M. Lipscomb, Cedarburg, WI (US); Stanley L. Suring, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 12/563,083

(22) Filed: Sep. 18, 2009

(65) Prior Publication Data
US 2010/0095899 A1 Apr. 22, 2010

Related U.S. Application Data

(60) Provisional application No. 61/097,870, filed on Sep. 18, 2008.

(51) Int. Cl.
*A01K 1/035* (2006.01)
(52) U.S. Cl. .......................... 119/166; 119/168
(58) Field of Classification Search .......... 119/165–172; 229/101, 114, 903, 906; 220/4.21–4.24, 220/575; 209/235, 370, 397
See application file for complete search history.

(56) References Cited

U.S. PATENT DOCUMENTS

| | | | |
|---|---|---|---|
| 2,015,119 A | | 9/1935 | McEwen |
| 2,028,677 A | * | 1/1936 | Lupton ........................ 229/148 |
| 2,268,906 A | * | 1/1942 | Scheer ..................... 229/117.15 |
| 2,344,008 A | * | 3/1944 | Trogman ................. 229/117.19 |
| 2,789,750 A | * | 4/1957 | Kramer ........................ 229/149 |
| 3,684,155 A | * | 8/1972 | Smith ..................... 229/117.07 |
| 3,809,013 A | | 5/1974 | Rigney et al. |
| 4,057,169 A | * | 11/1977 | Payne .......................... 220/4.23 |
| 4,267,959 A | * | 5/1981 | Gilbert ..................... 229/117.14 |
| 4,279,217 A | | 7/1981 | Behringer |
| 4,505,226 A | * | 3/1985 | Carlson .......................... 119/166 |
| 4,723,510 A | | 2/1988 | Skillestad |
| 4,724,955 A | | 2/1988 | Martin et al. |
| 4,784,082 A | | 11/1988 | Wolfe |
| 4,807,563 A | * | 2/1989 | Berry et al. .................... 119/168 |
| 4,870,924 A | | 10/1989 | Wolfe |
| 4,993,845 A | | 2/1991 | Faltynek |
| 5,031,578 A | | 7/1991 | Hammons et al. |
| 5,121,712 A | | 6/1992 | Schulein, Jr. et al. |
| 5,123,381 A | | 6/1992 | Salmon |
| 5,192,019 A | * | 3/1993 | Meehan ......................... 229/101 |
| 5,207,772 A | | 5/1993 | Lauretta et al. |
| 5,249,549 A | | 10/1993 | Rockaitis, III |
| 5,249,550 A | | 10/1993 | Hines et al. |
| 5,251,573 A | * | 10/1993 | Bremley ....................... 119/168 |
| 5,381,949 A | * | 1/1995 | Correll ....................... 229/198.2 |
| 5,488,929 A | | 2/1996 | Pierson et al. |
| 5,566,641 A | | 10/1996 | Radli et al. |
| 5,615,639 A | * | 4/1997 | Knight ........................ 119/168 |

(Continued)

*Primary Examiner* — Rob Swiatek
*Assistant Examiner* — Ebony Evans
(74) *Attorney, Agent, or Firm* — Boyle Fredrickson, S.C.

(57) ABSTRACT

A disposable litter pan that is made of a flexible material, preferably biodegradable non-plastic material, such as thermally pressed cardboard or other paper fiber material treated with an aqueous coating that inhibits degradation of the pan in the presence of fluids. The pan is a generally self-supporting pan structure having two end walls, two sidewalls, and a floor; wherein the floor having several perforations, openings, or orifices sized to allow unused cat litter to be sifted into a retaining pan underneath that can be of the same or imperforate construction. The litter pan folds, allowing the sidewalls to engage in a manner that does not allow litter or excrement to escape. The pan can be retained in the folded condition by an integral latching arrangement that also can serve as a handle.

21 Claims, 10 Drawing Sheets

U.S. PATENT DOCUMENTS

| | | |
|---|---|---|
| 5,655,479 A | 8/1997 | Armington et al. |
| 5,709,171 A | 1/1998 | Moore, III |
| 5,752,466 A | 5/1998 | Lundeen et al. |
| 5,785,001 A * | 7/1998 | Robinson ...................... 119/168 |
| 5,832,869 A | 11/1998 | Franczak et al. |
| 5,890,452 A * | 4/1999 | Lundeen et al. .............. 119/167 |
| 5,983,832 A | 11/1999 | Seo |
| 6,065,429 A * | 5/2000 | Crosse ......................... 119/165 |
| 6,382,131 B1 | 5/2002 | McGivern |
| 2002/0002954 A1 | 1/2002 | Goitiandia |
| 2004/0200890 A1 | 10/2004 | Mesly |
| 2008/0083376 A1* | 4/2008 | Hurwitz ........................ 119/167 |

* cited by examiner

DISPOSABLE FOLD-UP SIFTING ANIMAL LITTER FILTERING PAN

CROSS-REFERENCE

This application claims all benefits from and priority to, under 35 U.S.C. Section 119(e), U.S. Provisional Application Ser. No. 61/097,870, filed Sep. 18, 2008, the entirety of which is hereby expressly incorporated herein by reference.

FIELD

The present invention relates generally to an animal litter pan, particularly to a disposable, biodegradable pan which is perforate in construction to enable separation of still usable litter from excrement in the litter, and which can be folded to facilitate sifting and for ease of disposal.

BACKGROUND

One of the least desirable chores in cat ownership is cleaning the cat litter box. The most common litter box for a house cat is a square or rectangle-shaped plastic tub which is filled with urine-absorbent litter material. The litter material is usually either clay or granular cellulose. The litter material is usually sifted after a particular period of use, such as a few days, with a hand held scoop.

Other cleaning solutions consist of disposable cat litter box liners that are made of paper or plastic, able to be folded into a bag like configuration to dispose of the entire cat litter in the pan at any given time. U.S. Pat. No. 5,488,929 discloses an example of this type of cat litter pan liner. Disposable cat litter boxes have also been created, usually consisting of a single sheet of water resistant corrugated cardboard. As disclosed in U.S. Pat. No. 5,566,641, the litter box is a one-time use, allowing a user to throw away everything in the box, not just the used litter but any leftover unused litter as well.

While U.S. Pat. No. 5,121,712 discloses a liner that is perforated to allow sifting of used litter so unused litter can be returned to the litter box, the liner is made of plastic, which cats do not like. For whatever reason, cats are uncomfortable walking on plastic sheeting such that this type of perforate plastic liner can result in a cat not using the litter box.

It is desirable to not waste the unused cat litter, but be able to easily separate and remove the animal excrement and "used" litter and do so in a manner that is not repugnant to a cat.

SUMMARY

The present invention is directed to an animal litter holding and filtering pan that is particular well suited for use with cats that can sift unused litter, while retaining waste, and can be folded for easy disposal. The pan is made of a biodegradable thermally pressed cardboard or other paper/cellolosic fiber material treated to inhibit degradation in the presence of water, urine, excrement and the like. Such treatment can be in the form of an aqueous coasting or treatment that suitably impregnates the material from which the pan is made. The pan has several perforations that can be staggered or arranged in rows located along a fold region of a hinge arrangement that permits unused litter to pass through the pan into a pan of like (perforate) or non-perforate construction underneath thereby optimizing the use of litter. By locating the perforations along the fold line, not only is filtering of excrement from still useful litter performed more efficiently, but the excrement tends to flow and accumulate along the fold line so it becomes optimally positioned over the perforations. Thereafter, once the still unused litter has drained through the perforations, the excrement filled folded pan can be thrown away.

A film or liner can be used to cover the perforations in a manner where it can be removed either prior to use or prior to disposal. In one embodiment, such a liner or film is of peel-away construction and is attached, such as by an adhesive or the like, to a surface of the bottom of the pan. In one preferred embodiment, a peel away liner or film is attached to the bottom surface of the bottom wall of the pan and covers all of the perforations of the pan.

In one embodiment of the invention, the pan may be nested into a non-perforate pan, an imperforate pan of similar construction, or a traditional cat litter box. This allows a pet owner to sift the litter, allowing the unused litter to collect in the pan below.

In one embodiment of the invention, the sidewalls may have slits formed downwardly to create a hinge when the litter pan is folded.

In another embodiment of the invention, the sidewalls of the cat litter pan can be continuous, and have fold lines in a dual triangular shape generally in the middle portion of the sidewalls. This allows the pan to be folded, while the sidewalls have a telescoping connection to prevent litter from escaping out the side.

In another embodiment, there can be "soft" creases along either side of the main fold line on the sidewalls of the litter pan. These soft creases aid in making a 90 degree fold at the right spot, allowing the sides to fit snugly together when the pan is folded in half.

In another embodiment, the pan is equipped with an integrally formed latching arrangement that retains the pan in a closed condition, such as after sifting has been performed, with the latching arrangement configurable to also provide a handle.

Objects, features, and advantages of the present invention include one or more of the following: to provide a litter pan that is made of a flexible material, preferably biodegradable non-plastic material, such as thermally pressed cardboard or other paper fiber material treated with an aqueous coating that inhibits degradation of the pan in the presence of fluids; to provide a litter box that is a generally self-supporting pan structure having two end walls, two sidewalls, and a floor; to provide a litter box that has a floor having several perforations, openings, or orifices sized to allow unused cat litter to be sifted into a retaining pan underneath; to provide a cat litter box that has a fold line bisecting the litter pan to allow the entire pan to be folded in half, wherein the sidewalls connect telescopically to ensure a secure fit that does not allow litter or excrement to escape; to provide a disposable cat litter pan wherein the pan is further designed to allow excrement to naturally flow and accumulate along the fold line over the perforations; a disposable cat litter pan that is simple, easy and sanitary to use; to provide a cat litter box that is stable and made of fibrous material that cats more readily accept; to provide a disposable cat litter pan that is easy to manufacture, lightweight, rugged, durable, reliable, economical to manufacture, and/or which is easy to assemble and use.

Various other features, advantages and objects of the present invention will be made apparent from the following detailed description and the drawings.

DRAWING DESCRIPTION

Preferred exemplary embodiments of the invention are illustrated in the accompanying drawings in which like reference numerals represent like parts throughout and in which:

FIG. 1 is a top perspective view of one embodiment of a sifting biodegradable disposable litter pan of the present invention, showing the litter pan substantially flat in an open condition after sifting has been performed.

FIG. 9 illustrates the pan in a completely closed condition ready to be disposed of in a garbage bag, garbage can or the like;

DETAILED DESCRIPTION

Figure 2:
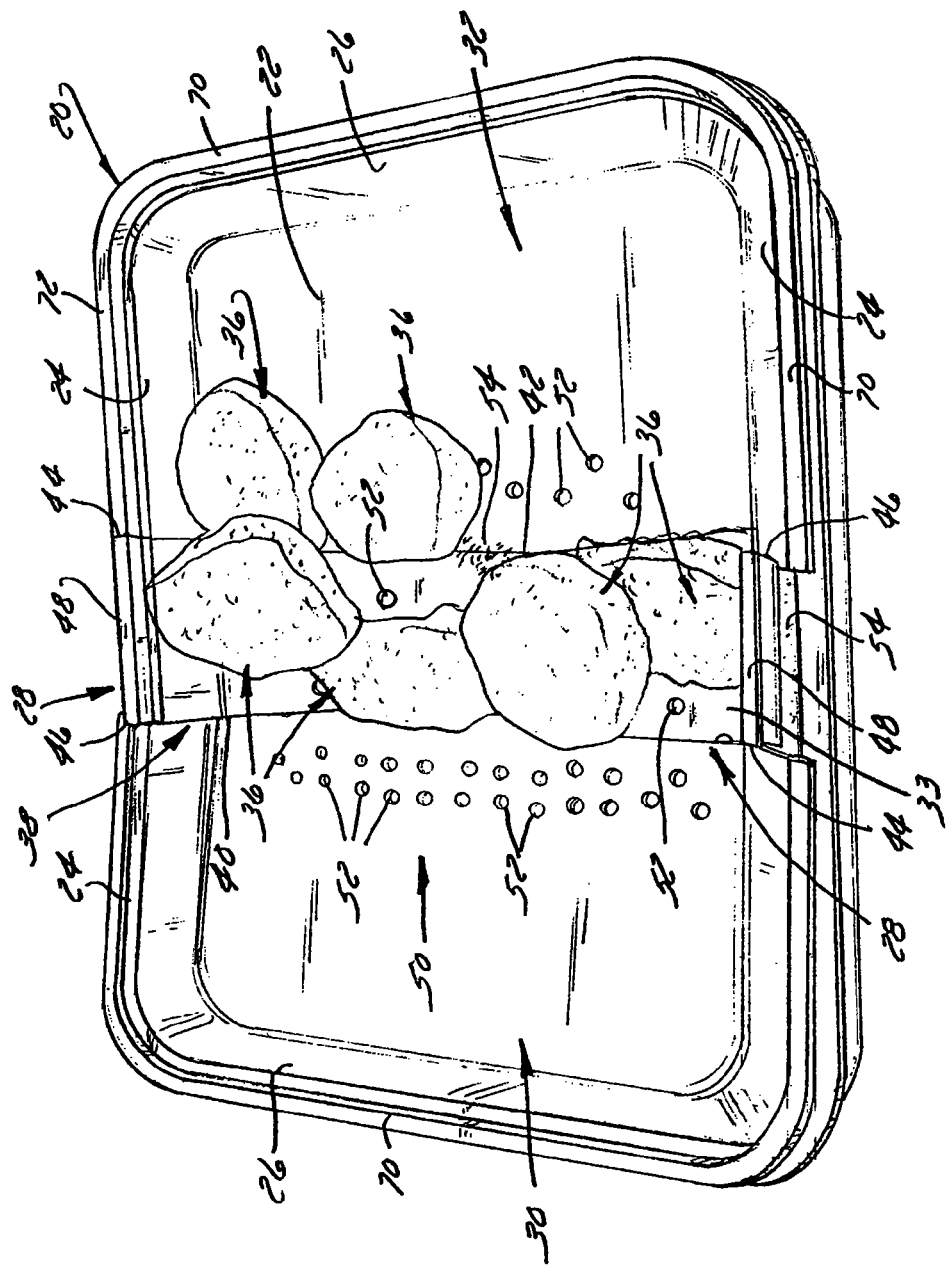
FIG. 2 is a top perspective view the biodegradable disposable pan filled or charged with litter.
Figure 2:
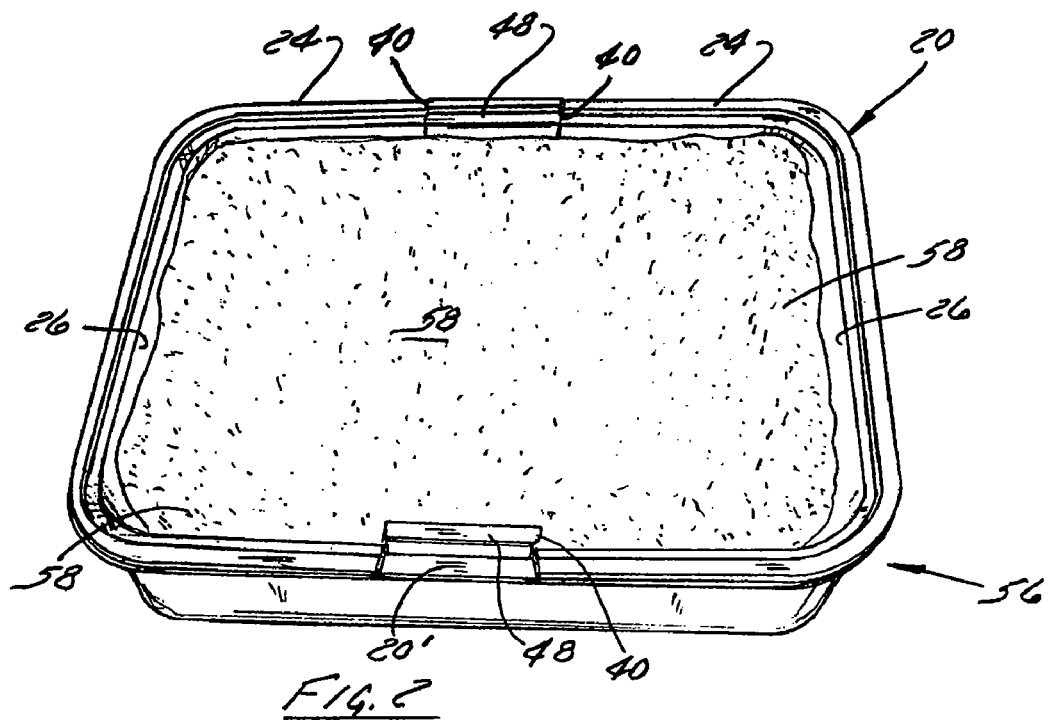

FIGS. 1-10 illustrate a first embodiment of a disposable sifting cat litter pan 20 of this invention. The pan 20 includes a bottom or floor 22, two upwardly extending sidewalls 24, and two upwardly extending end walls 26, forming a generally self-supporting pan structure that can be constructed to have a depth of at least about one and one-half inches. To facilitate acceptance and consistent usage by a cat, the disposable cat litter pan 20 is composed of a cellulosic material, such as paper fiber, cardboard or the like. It can be treated, such as with a liquid, powder or other material, in a manner that inhibits the effects of urine, feces and water. In the preferred embodiment shown in the FIGS. 1-10, the pan 20 is formed of one-piece, unitary and substantially homogenous construction being made of a cellulosic material, such as paper fiber or cardboard, so as to be of fold-up and sifting construction that is disposable after use. In at least one preferred embodiment, the pan 20 is made of a biodegradable thermally pressed cardboard or other paper/cellulosic fiber material treated with an aqueous coating that inhibits degradation in the presence of water, urine, feces and the like. It can also be impregnated with such an aqueous urine, water, and feces degradation inhibiting liquid or other inhibiting material.

FIG. 1 illustrates the disposable cat litter pan 20 after it has been used to sift and remove unused/unspoiled litter but before disposal. It includes a hinge arrangement 28 that extends generally transversely across at least a portion of the bottom 22 of the pan 20 generally dividing the pan 20 into a plurality of pan halves 30, 32 that are folded over one another during use, forming a convenient, easy to carry, disposable satchel-like case 34 (FIGS. 7, 9 and 18) that encases sifted litter clumps 36 holding feces and/or urine in a manner that is advantageously quick and easy to dispose of without coming into direct contact therewith.

In the preferred embodiment shown in FIG. 1, the hinge arrangement 28 is formed at least in part by a fold region 38 that is defined by at least two fold lines 40, 42 that extend transversely substantially along the entire pan bottom 22 and which preferably are integrally formed in the bottom 22. At least a portion of each fold line 40, 42 can be integrally formed by scoring part of the pan bottom 22, such as during forming or molding of the pan 20.

The hinge arrangement 28 can also include a pair of slits or cuts 44, 46 in each sidewall 24 that runs adjacent to and can be in line with or otherwise in communication with one end of a corresponding fold line 40, 42. The slits or cuts 44, 46 form a flap 48 out of a portion of each sidewall 24 that permits adjacent portions of each sidewall to slide inwardly of the flap 48 during folding of one pan half 30 over the other pan half 32 increasing the ease of folding while preventing loss of unused/unspoiled litter left in the pan 20.

Along and adjacent to the fold region 38 is a perforate litter sifting region 50 that includes at least a plurality of pairs, i.e., at least three, of perforations 52 that each extend completely through the pan bottom 22. The perforations 52 can be arranged in lines, such as is depicted in the bottom of pan half 30 or in a staggered array, such as is depicted in the bottom of pan half 32. There is at least a plurality of pairs of, i.e., at least three, perforations 52 disposed between the fold lines 40, 42 and at least a plurality of pairs of perforations 52 disposed outwardly of each fold line 40, 42.

The perforations 52 are sized generally to allow unused/unspoiled cat litter 54 to pass through, while retaining that which formed into clumps 36 resulting from the absorption of excrement. In one preferred embodiment, each perforation 52 has a diameter of about one-eight of an inch. Each perforation 52 preferably has a diameter of at least one-sixteenth of an inch and a diameter of no greater than three-eighths of an inch.

The pan 20 is shown generally overlying and nesting in another pan, 20', only a small portion of which is shown in FIG. 1, in which unused cat litter 54 is disposed. Pan, 20', can have the same perforate sifting construction as pan 20 or can be of imperforate construction. In one embodiment, pan, 20', is one of at least a plurality of pairs of pans having the same construction as pan 20 with the pans being nested or stacked one on top of another.

If desired, each such pan 20 can come prepackaged with a layer of unused/unspoiled cat litter 54 in it that is intended to be makeup litter intended to make up for litter in the overlying pan 20 that ends up getting used and disposed of. Thus, in one preferred implementation, there is at least a thin layer of unused/unspoiled cat litter in each pan 20 located below the top pan 20 with the pans all stacked together one on top of another forming a prepackaged pan stack each being pre-charged with litter. It is anticipated that the top pan would be pre-charged with the most unused/unspoiled litter as a certain percentage of it, perhaps more than 50%, would be expected to remain unused/unspoiled and pass through the perforations 52 of the top pan 20 into the pan 20 immediately underneath. It is anticipated that the bottom-most pan (not shown) in the pan stack would be shaped similarly to or same as pan 20 but be of imperforate construction.

In any event, pan, 20', is located underneath pan 20 to receive the remaining unused or unspoiled litter 54 that has been sifted through the perforations 52 of the pan's litter sifting region 50 when the pan 20 is picked up, folded along fold region, and/or shaken to cause the unused/unspoiled litter 54 to fall through the perforations 42 in pan 20 into the pan, 20', below. Of course, the order in which these steps are taken can vary from that set forth in the preceding sentence.

FIG. 2 illustrates a preferred embodiment of the pan 20 stacked in a pan arrangement 56 composed of at least a plurality of pairs of stacked pans 20 nested in the manner shown with at least the uppermost pan 20 coming pre-charged with fresh litter 58. It is contemplated that the pan arrangement 56 comes prepackaged in a box, carton, or is wrapped in plastic. As previously discussed, the bottommost pan can be of imperforate construction. Each pan 20 located below the top pan 20 and above the bottommost imperforate retainer pan (not shown) can also come pre-charged with a layer of fresh litter 58.

It is contemplated that the top pan 20 is pre-charged with the most fresh litter 58 with each pan 20 nested underneath having a lesser amount of pre-charged litter 58. This is because during use and operation, it is anticipated that the majority of the litter 58 in the top pan 20 will end up being sifted through the perforations 52 into the pan 20 immediately below. In one preferred implementation, the top pan is pre-charged with the greatest amount of fresh litter 58, the second pan nested immediately underneath the top pan is charged with a lesser amount of litter 58, the third pan nested immediately underneath the second pan is charged with an even lesser amount of litter 58, and so forth. In another preferred implementation, the top pan 20 is charged with the most litter 58, the imperforate pan is charged with the second greatest amount of fresh litter 58, the pan that nests in the imperforate pan is charged with the third greatest amount of fresh litter, and so forth. Routine testing and experimentation can be employed to optimize the amount of litter pre-charged in the top pan 20, as well as each successive nested pan 20, and the imperforate bottom pan.

The disposable pan 20 is placed in a location typical of where any other litter pan would be located in a house or other environment where a cat lives or otherwise frequents. Since the height of each pan sidewall 24 and end wall 26 is selected so that the height of the stacked pan arrangement 56 provides a height low enough that a cat can get into and out of the uppermost pan 20. In a preferred embodiment, the combined height of the stack 56 is no greater than about ten to twelve inches or so to enable a cat to easily get in to and out of the uppermost pan 20 and any intermediate pan 20 depending upon how many pans 20 have been disposed of. In a preferred embodiment, the combined height is low enough where a cat approaching a stacked pan arrangement 56 can visually see at least a small portion of the litter in the exposed, uppermost pan 20.

Figure 3:
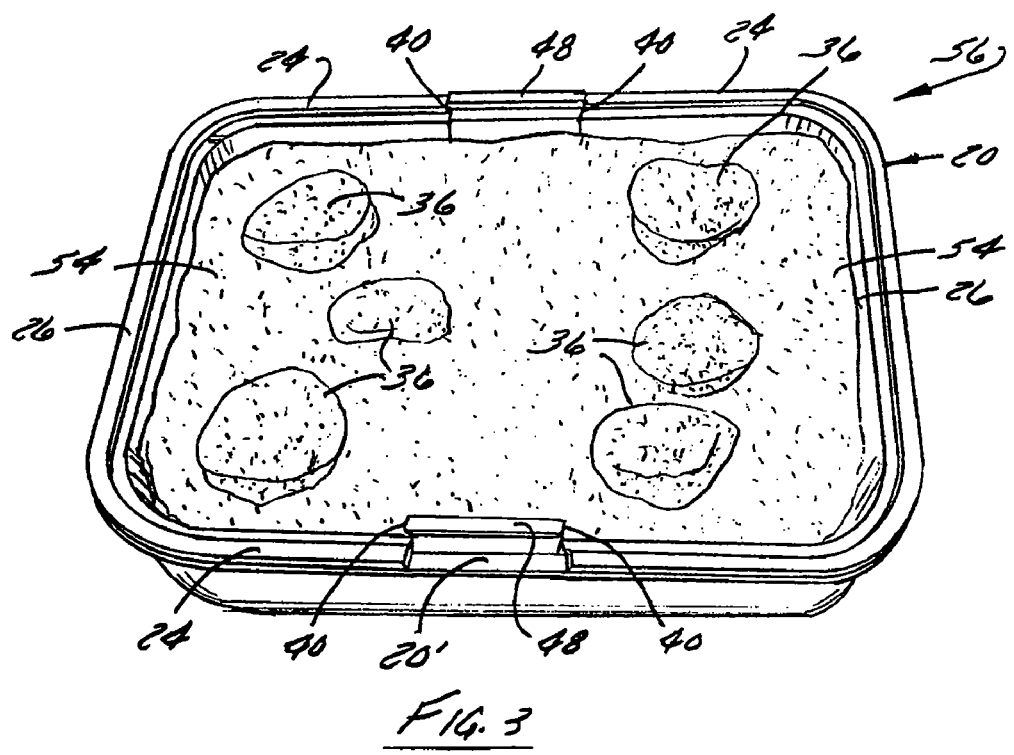
FIG. 3 is a top perspective view of the pan of FIG. 2 where excrement has created clumps in some of the litter in the biodegradable disposable pan leaving other litter unused and/or unspoiled.
Figure 5:
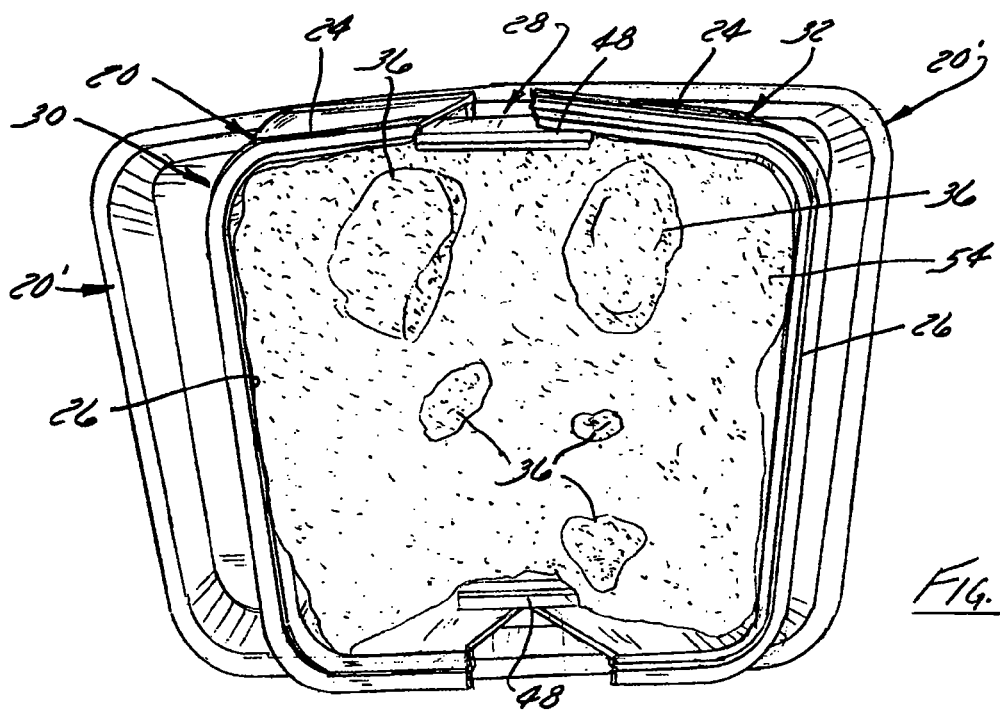
FIG. 5 is a top perspective view the biodegradable disposable pan folded even more, showing movement of the clumps and unused/unspoiled letter toward a perforate sifting region located in the area of the hinge arrangement.

With reference to FIG. 3, use of the top litter pan 20 by a cat results in cat excrement causing litter 58 in the pan 20 to absorb the excrement and form clumps 36. When a suitable amount of clumps 36 have been formed or when odor therefrom becomes undesirably noticeable, it is time to dispose of the clumps 36 along with the topmost pan 20.

Figure 4:
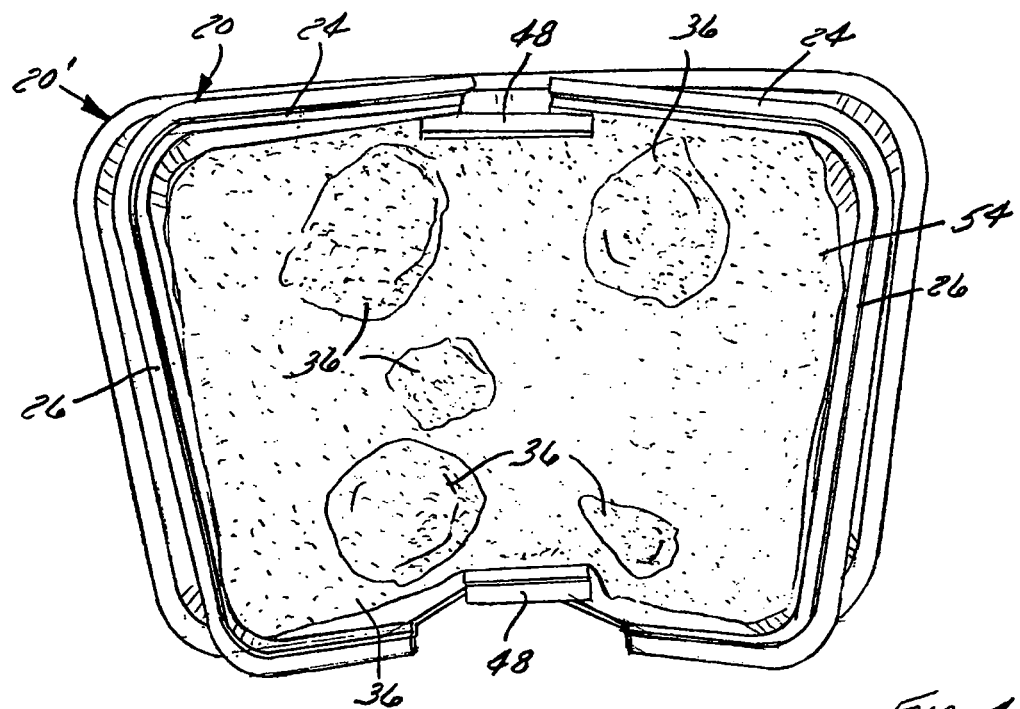
FIG. 4 is a top perspective view of the biodegradable disposable pan, showing the litter pan moderately folded, and illustrating operation of a integrally formed hinge arrangement.

With reference to FIG. 4, the top pan 20 is manually grasped along each end wall 26 and lifted free of the pan 20 underneath. As the top pan 20 is lifted, the weight of the litter and excrement in the pan 20 causes the two pan halves 30, 32 to begin converging together as a result of folding about the hinge arrangement 28. With additional reference to FIGS. 5-7, continued folding of the pan halves 30, 32 together causes the unused/unspoiled cat litter 54 in the pan 20 to begin flowing out of the perforations 52 of the litter sifting region 50 leaving the clumps 36 in the folded pan 20. As folding occurs, flaps 48 permit the outer edges of the sidewalls 24 to be brought toward each other without interference while also keeping unspoiled/unused litter 54 in the pan 20 where it can be sifted into the pan below. It is important that folded pan 20 remain over the pan 20' in which it was nested so that the unused/unspoiled litter 54 flows out the perforations 52 in the bottom 22 of the pan 20 and into the pan 20' located immediately underneath.

If desired, and in one preferred implementation of a method of using a disposable pan 20 constructed in accordance with the present invention, the pan 20 being folded is also shaken either during or after folding to facilitate flow of unused/unspoiled cat litter 54 from the perforations 52 of the litter sifting region 50 of the pan 20. Shaking can be done as needed until all or virtually all of the unused/unspoiled cat litter 54 has been sifted into the pan 20' below.

Figure 7:
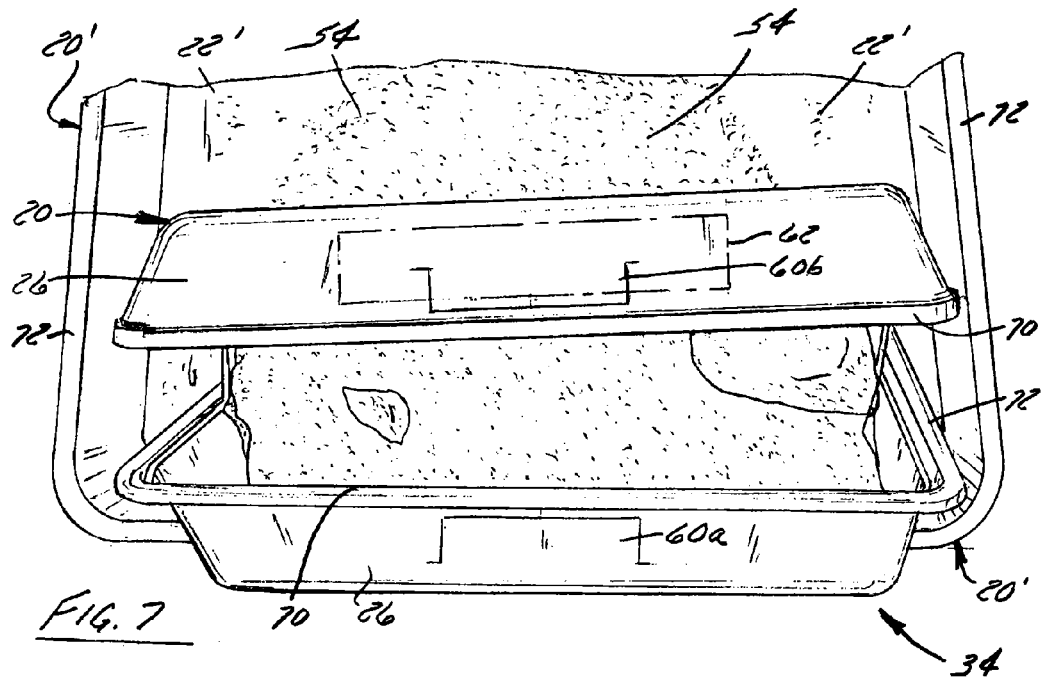
FIG. 7 is a top perspective view of the biodegradable disposable pan nearly completely closed showing that unused/unspoiled cat litter sifted from the pan has fallen into a retaining pan underneath that can be of the same biodegradable disposable and sifting construction or which can be of imperforate construction.
Figure 6:
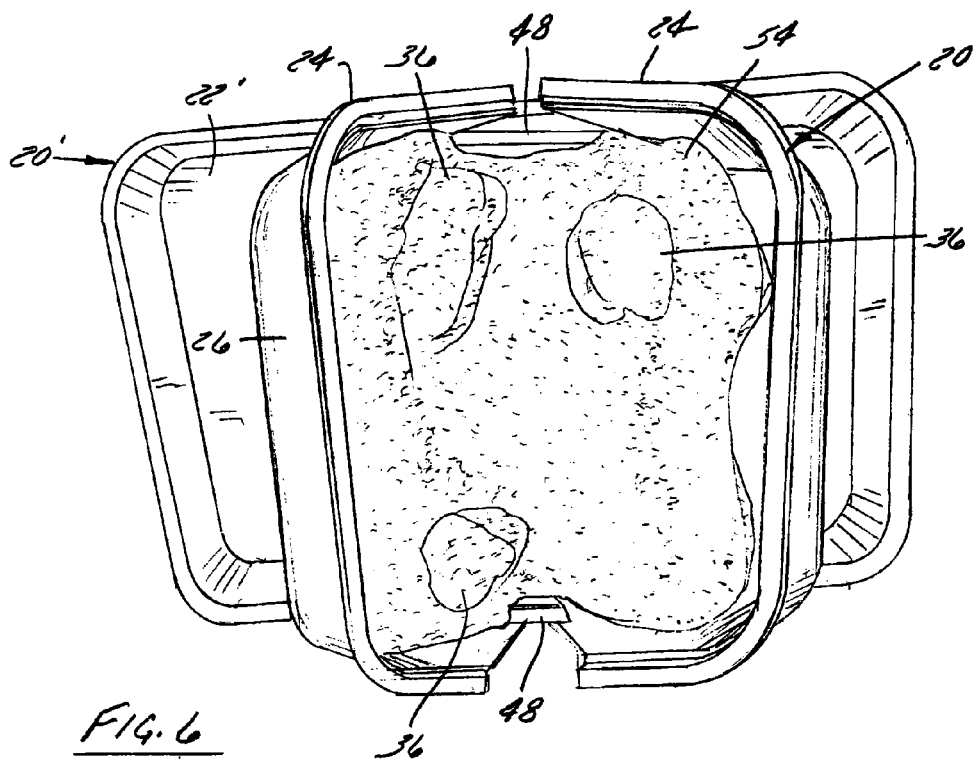
FIG. 6 is a top perspective view of the biodegradable disposable litter sifting pan folded even more than in FIG. 5.

As is best shown in FIG. 7, folding is performed until the side walls 24 and end wall 26 of each pan half 30, 32 overlies one another causing the halves 30, 32 to enclose the clumps 36 within a satchel-like case 34. If desired, one or both halves 30, 32 can be configured with or to otherwise provide a latch arrangement 60a, 60b that can be configured to engage each other, so that at least one engages a portion of end wall 26, or another latching configuration that retains the halves 30, 32 in a substantially completely folded condition where the side walls 24 and end walls 26 of the pan halves 30, 32 contact or otherwise engage one another. Additionally, one or both pan halves 30, 32 can be equipped with a handle 62 (generically depicted in phantom in FIG. 7) that can be integrally formed with or otherwise attached to one or both pan end walls 26. In this regard, such a latch arrangement, e.g., latch arrangement 60a and 60b, can be used to retain pan halves 30, 32 in a completely closed or substantially completely closed condition permitting a person to grasp the resultant case 34 formed therefrom, such as using one or more handles, e.g., handle 62, enabling it to be carried away and disposed of, such as by placement in a garbage bag, a garbage can or the like. An example of one suitable handle 62 is an oval or otherwise oblong cutout in the pan end wall 26.

Figure 8:
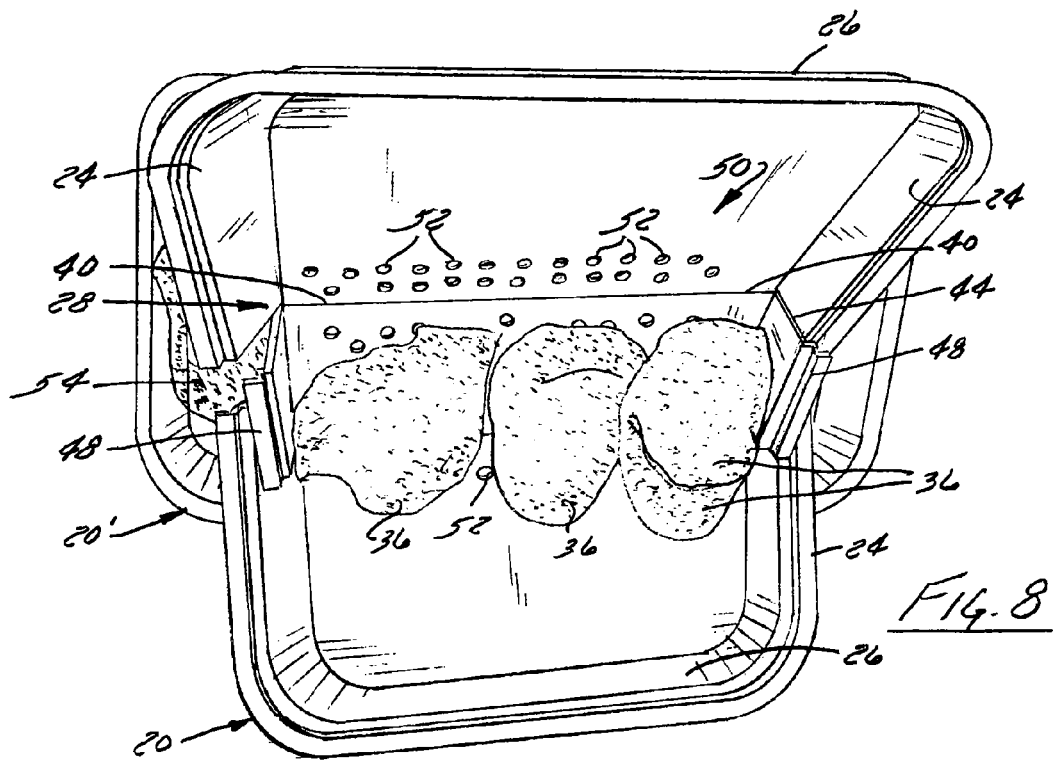
FIG. 8 is a top perspective view of the biodegradable disposable pan opened to show how the unused/unspoiled cat litter has been sifted from it leaving only clumps of feces absorbing litter.
Figure 9:
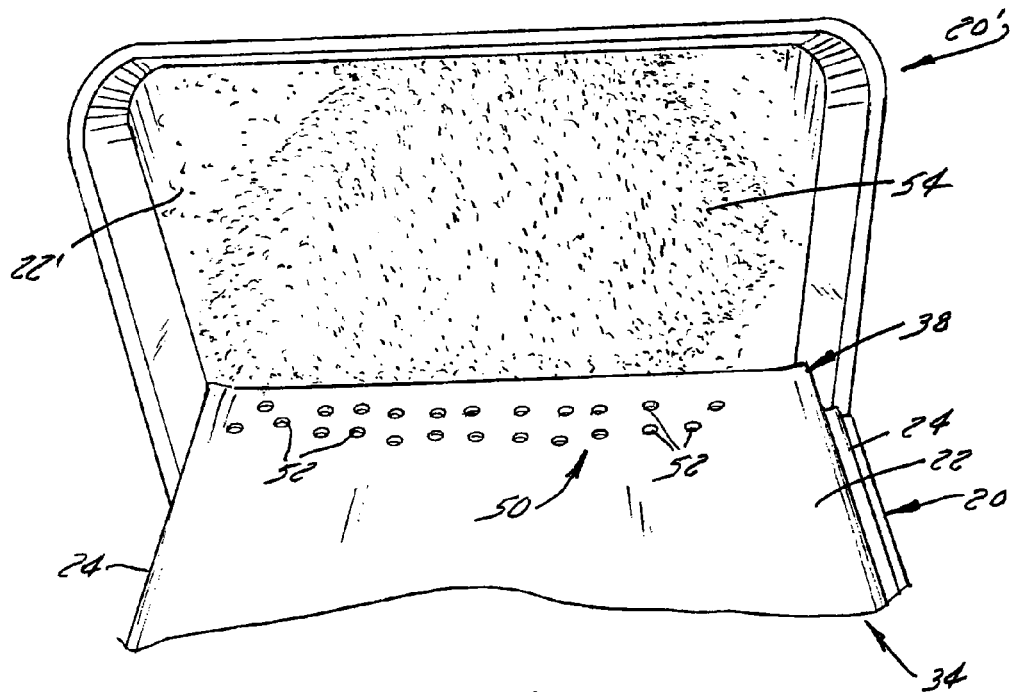

FIG. 8 illustrates the pan 20 in a semi-opened condition after performing the folding, shaking and sifting operations to show that all or nearly all of the unused/unspoiled litter 54 has been sifted into the pan 20' underneath. FIG. 9 illustrates the litter sifting, feces holding pan 20 in its completely closed condition with the unused/unspoiled litter 54 deposited in the pan 20' underneath. It should be noted that the pan 20' underneath in the example shown in FIG. 9 has a bottom 22' of imperforate construction. Such a bottom most pan can be and preferably is configured with a hinge arrangement that is the same as or similar to pan 20.

Figure 10:
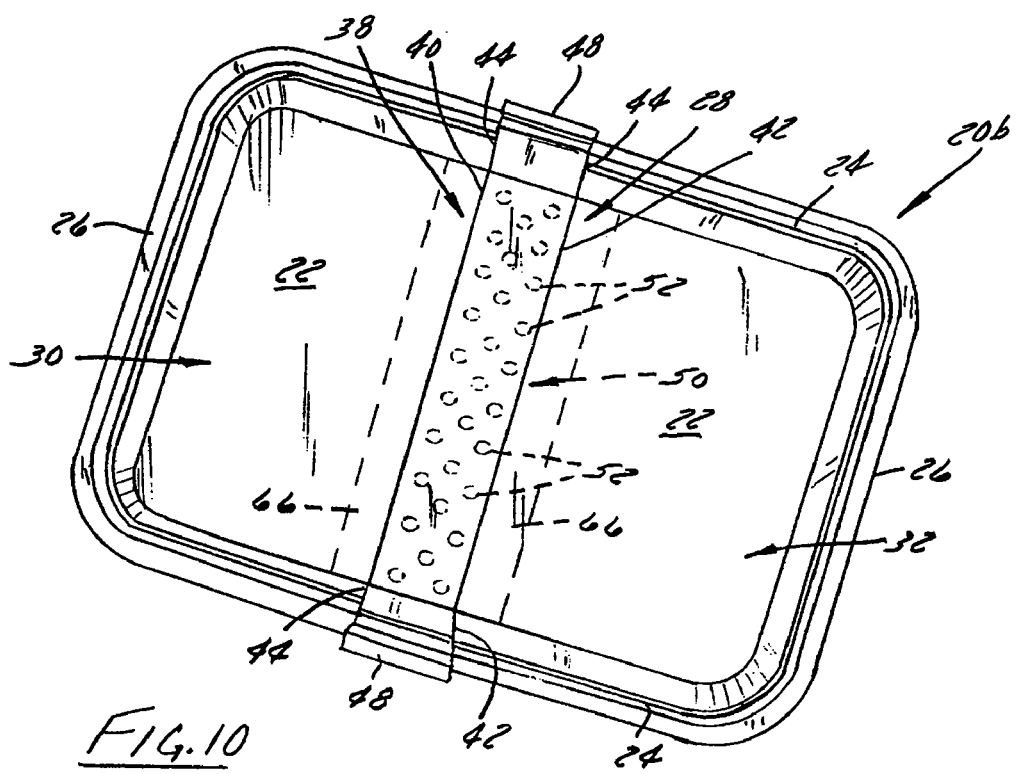
FIG. 10 illustrates a top plan view of a second preferred pan embodiment in an opened condition.
Figure 11:
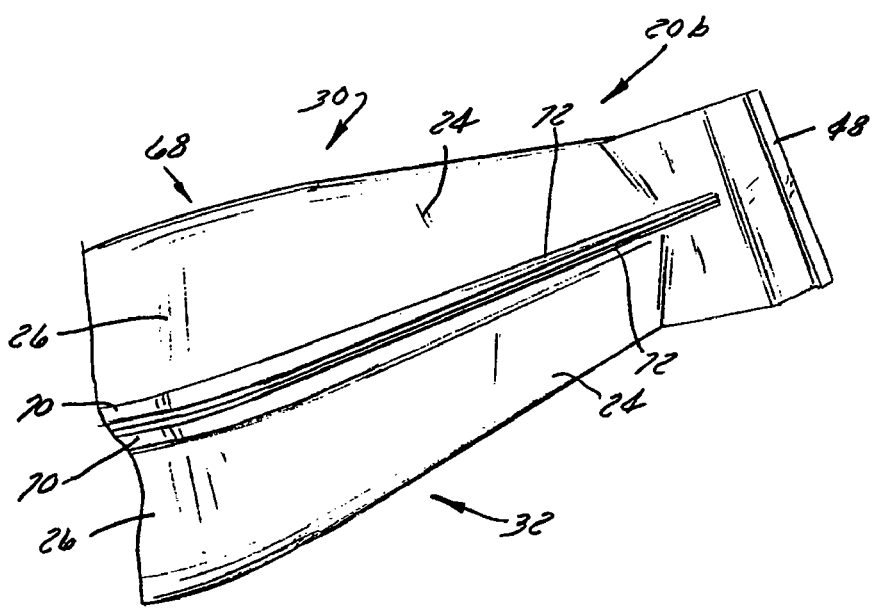
FIG. 11 is a partial fragmentary perspective view of the pan of FIG. 10 in a fully closed condition

FIGS. 10 and 11 show another embodiment of a pan 20b that need not be of perforate construction and which includes a hinge arrangement that is similar to or same as the pan 20 shown in FIGS. 1-9. The pan 20b is formed of a sheet, such as a sheet of cellulosic or other fibrous construction, which is three dimensionally contoured to form a bottom or floor 22 that can be generally planar, a pair of upraised and spaced apart sidewalls 24, and a pair of spaced apart end walls 26. Such a pan can be of one-piece, unitary and substantially homogeneous construction having integrally formed fold lines that divide the pan into a pair of halves 30, 32 that are outer sections which are separated by a middle section 33 defined by a pair of fold lines 40, 42 that extend from side to side of the bottom 22.

As is shown in phantom, the middle section 33 can have a plurality of pairs of perforations 52 that extend completely therethrough and which are sized to permit flow of clean litter while opposing passage of excrement. The middle section 33 forms along with fold lines 40, 42 a hinge arrangement 28 that serves to facilitate folding of the two pan halves 30, 32 into a container 68 that when closed holds at least excrement in a manner permitting its convenient and sanitary disposal. As previously discussed, such a pan 20b is nestable within a plurality of other pans of like construction so as to be sold in a prepackaged manner in a store. Such a prepackaged arrangement can include litter in each one of at least a plurality of pans 20b with the litter in the uppermost pan 20b captured in place by packaging material that can be plastic film, cellophane, paper or the like.

Where the pan 20b is of imperforate construction, it can be the bottommost pan of a stack of nested pans that are of perforate construction, such as the pan 20 shown in FIGS. 1-9. If desired, such a bottom most pan 20b can be configured to be imperforate by placing a liner 66 that can be a film or other thin covering over the perforations 52 to prevent any litter from falling onto the floor or another unintended surface. Such a liner or film 66 can be attached to an underside of the bottom wall 22 over all of the perforations 52 to prevent litter from flowing out the perforations unless and until a user peels away the liner or film 66. In a preferred embodiment, the liner or film 66 is attached to the pan underside so a cat in the litter cannot come into contact with it. This provides a user with the ability to open another package of nested pans before peeling away the liner or film 66 allowing unused litter to flow into the uppermost pan of the newly opened package. If desired, each such pan 20b in a stack of nested pans can include such a peel away liner or film 66.

FIG. 11 shows the pan 20b with one half 30 folded over the other half 32 about the fold lines 40, 42 of the hinge arrangement 28 forming a substantially closed container 68 in which excrement is conveniently contained in a sanitary manner. The outer edge of each sidewall 24 and end wall 26 can include an outwardly extending lip 70, 72 that abut when the halves 30, 32 are completely folded over one another. Each such lip 70, 72 can be or include an outwardly extending flat flange. This same feature can also be present in the pan embodiment 20 shown in FIGS. 1-9. Abutment of the lips 70, 72 helps to ensure that unused litter as well as excrement does not pass between them when the pan is folded over and closed. When the halves are completely folded over one another, each flap 48 that extends along the side edge of the middle section 33 extends outwardly generally perpendicularly to the abutting lips 72 of corresponding sidewalls 24. Each such flap 48 can abut against lips 72 also helping to prevent passage of unused litter and excrement from a closed pan while facilitating folding of one of the halves 30 over the other one of the halves 32.

Figure 12:
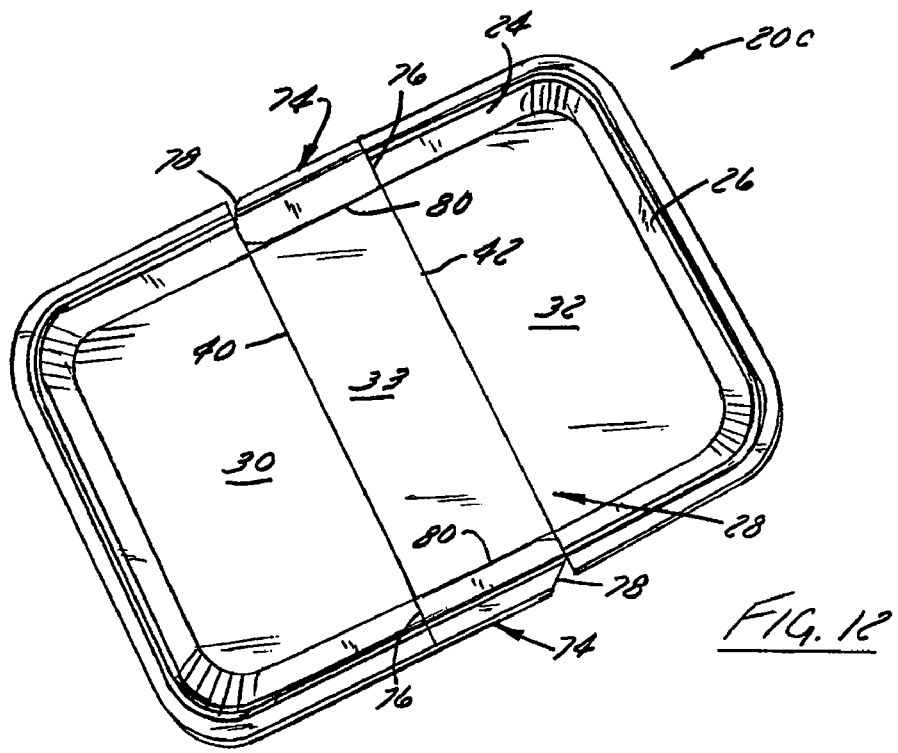
FIG. 12 is a top plan view of a third preferred pan embodiment in an opened condition.
Figure 13:
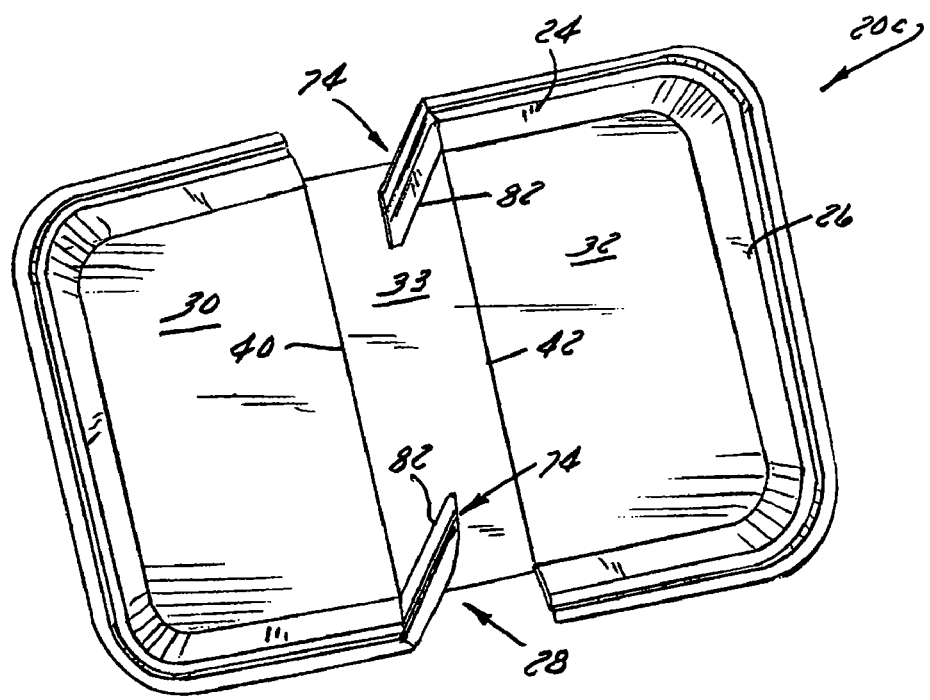
FIG. 13 is a top plan view of the pan of FIG. 12 with folding accommodating tabs in a fold facilitating position.
Figure 14:
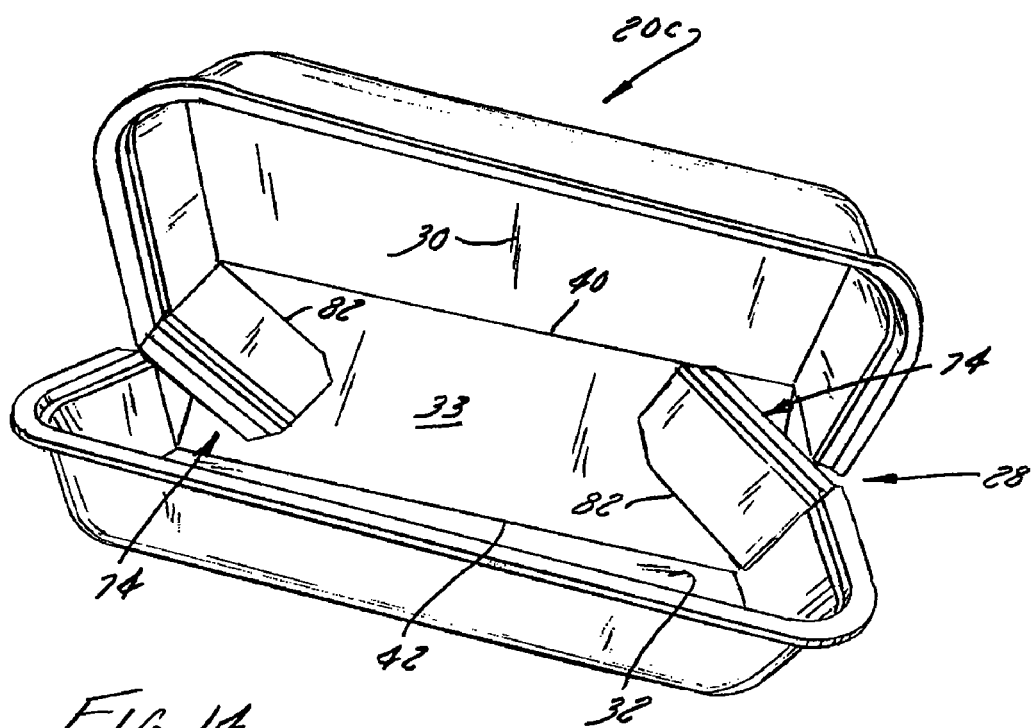
FIG. 14 is a top front perspective view of the pan of FIGS. 12 and 13 with the pan halves being folded toward the closed position showing folding or displacement of the folding accommodating tabs.

FIGS. 12-14 illustrate a second preferred embodiment of a pan 20c that can be of perforate construction and which employs another type of fold facilitating flap 74 that extends along at least a portion of a side of the middle section 33. Each flap 74 is defined by a fold line 76 that can be an extension of one of the fold lines 40, 42 on one side and a slit or cutout 78 in a sidewall 24 that can be located at or adjacent where the other one of the fold lines, 40, 42 terminate. In addition, a further slit or cutout 80 extending along at least a portion of an outside edge of middle section 33 defines a bottom edge 82 of the flap 74 such that during closure of the pan 20c, each one of the flaps 74 bends about fold line 76 into the interior helping to facilitate folding as well as helping to keep unused litter and excrement inside.

Figure 16:
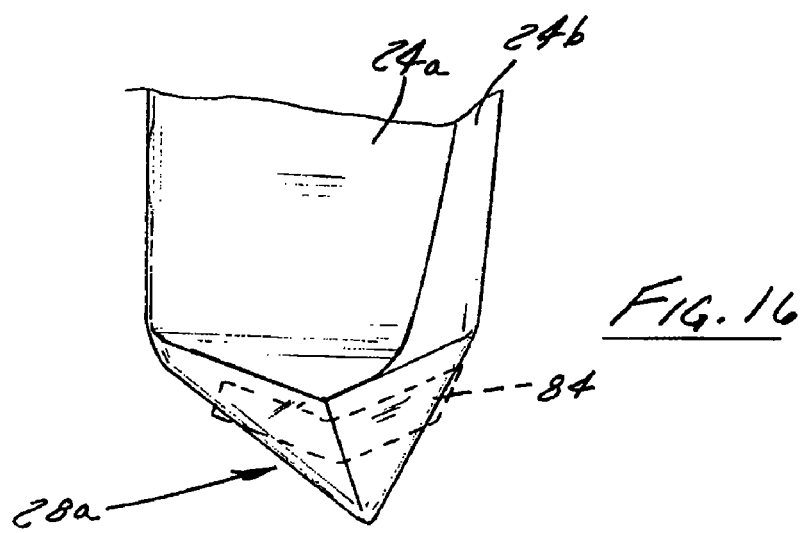
FIG. 16 is a side elevation view of a portion of a sidewall of illustrating the second preferred hinge arrangement with the pan in a folded condition.
Figure 15:
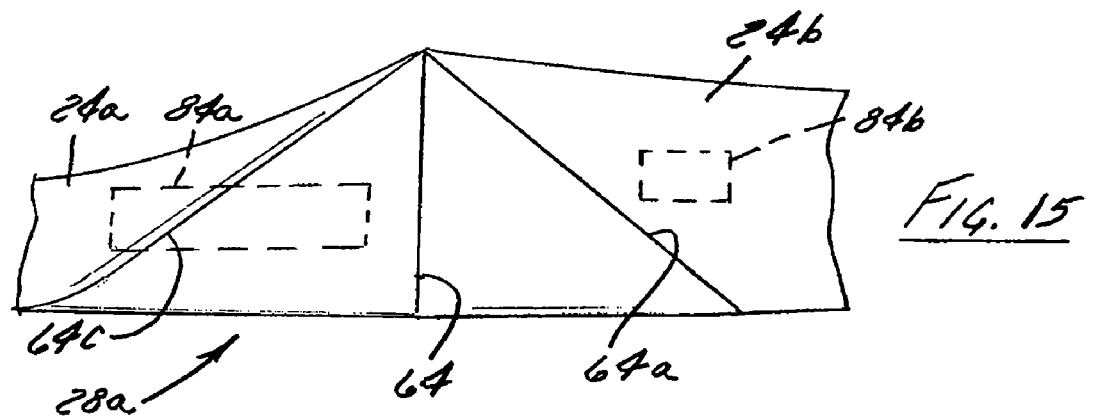
FIG. 15 is a partial fragmentary side elevation view of a portion of the pan sidewalls showing the pan in at least a semi-opened condition illustrating details of construction of a second preferred hinge arrangement.

FIGS. 15-16 illustrate another hinge arrangement 28a that can be used with a pan, e.g., pan 20-20c, constructed in accordance with the present invention that requires no slits or cuts in pan sidewalls 24a and 24b with a portion of one sidewall 24b telescoping inside a portion of the other sidewall 24a during folding of one pan half 30, 32 over other pan half 30, 32. A closure 84, such as depicted in phantom, can be attached to one sidewall 24a and be attachable to the other sidewall 24b, such as is depicted in FIG. 16, when the pan is folded into the closed position. An example of such a closure 84 can be in the form of tape or the like. Such a closure can also be of two-piece construction having one closure element 84a attached to one of the sidewalls 24a be engageable with any other closure element 84b attached to the other one of the sidewalls 24a such as is shown in FIG. 15. An example of such a multiple piece closure 84a, 84b, is a hook and loop fastener having one closure piece 84a attached to one of the sidewalls 24b with a portion extending outwardly therefrom that is attachable to another closure piece 84b attached to the other one of the sidewalls 24b when the pan halves 30, 32 are folded over one another into the closed position thereby helping to secure and maintain them in the closed position. As a result of the tight seams in the region of the continuous or uninterrupted hinge arrangement 28a that are formed when the pan is folded and closed, there are no gaps through which unused/unspoiled cat litter can leak through during folding of the pan.

FIG. 15 illustrates the construction of the hinge arrangement 28a more clearly by depicting a portion of the pan when the pan is in a partially folded condition. The hinge arrangement 28a is formed using a plurality integrally formed scores or fold lines 64a, 64b, and 64c that can be of perforate construction which form at least one crease in at least one of the sidewalls 24a, 24b with the sidewalls 24a, 24b being uninterrupted by any cut or slit. Such an arrangement produces a generally continuous or uninterrupted substantially straight sidewall 24 when the pan is in its fully open condition.

Figure 17:
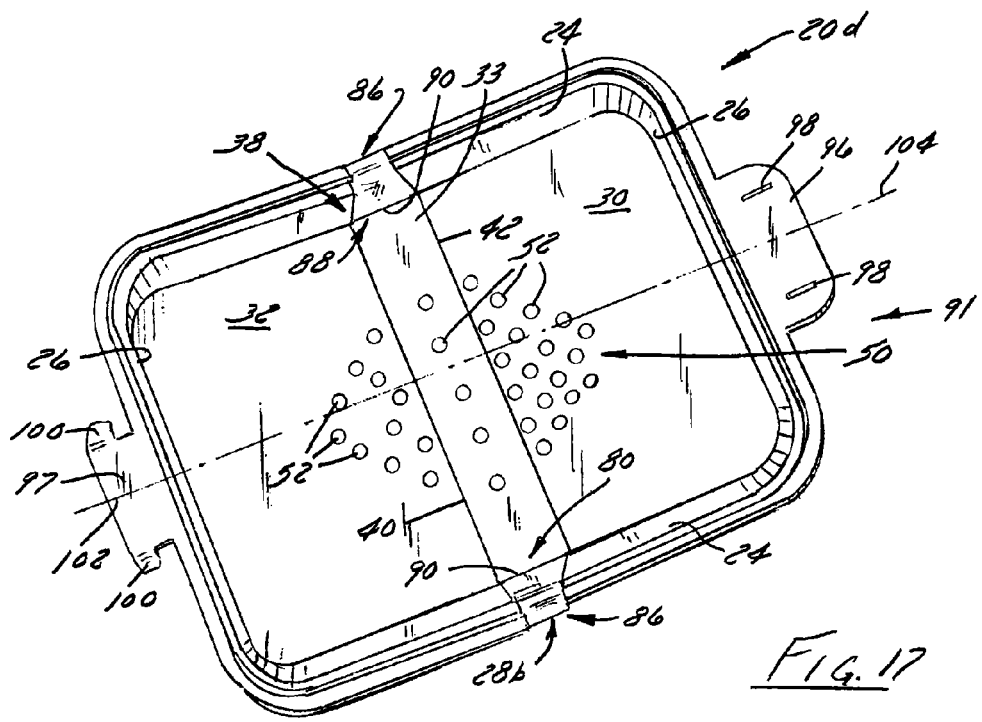
FIG. 17 is a top plan view of a fourth preferred pan embodiment in an opened condition that is equipped with a handle arrangement.
Figure 18:
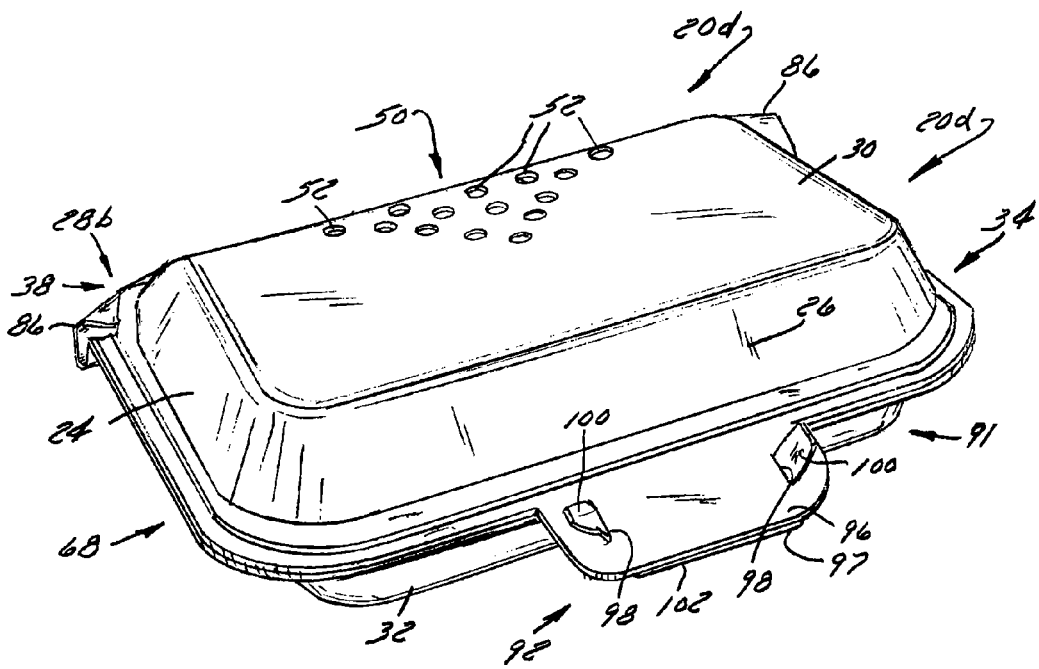
FIG. 18 is a top plan view of the fourth preferred pan embodiment in a fully closed and latched condition.

FIGS. 17 and 18 illustrate a still further preferred embodiment of a pan 20d that is constructed in accordance with the present invention and which includes a further hinge arrangement 28b formed by a panel 86 that can be of flexible and imperforate construction extending from one side of pan intermediate interrupted portion 88 of the sidewall 24 of one pan half 30, 32 to the other side of the intermediate interrupted portion 88 of the sidewall 24 of the other pan half 30, 32 on each side.

Each panel 86 can be made of a flexible and resilient material, such as of a plastic film or sheeting that is attached to part of the sidewall 24 on each side of the interrupted portion 88 as well as to part of the bottom wall 22 along or adjacent a corresponding outside edge 90 of the middle section 33. Each panel 86 can have a portion (not shown) that overlaps sidewall 24 and/or bottom wall 22 interiorly or exteriorly with the overlapping panel portion attached in any suitable manner including using an adhesive, using a heat seal, or using a mechanical attachment arrangement that can include staples, barbs or the like. When the pan 20*d* is disposed in the folded condition, such as is shown in FIG. 18, each panel 84 flexibly is foldable over a portion of itself in a manner that helps keep unused litter and excrement inside.

Pan 20*d* also includes a preferred embodiment of a handle closure 91 that enables the pan halves 30, 32 to be retained in the closed position by an integrally formed latching arrangement 92, forming a closed disposable container 68 (FIG. 18), while providing an integrally formed handle 94 that is easy to grasp. The handle closure 91 includes a first elongate handle flap 96 that extends outwardly from one end wall 26 of one of the pan halves 30, 32 that has a pair of slots 98 formed therein that each receives a corresponding ear 100 formed in a second elongate handle flap 102 that extends upwardly from the other end wall 26 of the other one of the pan halves 30, 32.

When the pan halves are folded over one another about the hinge arrangement, each ear 100 of flap 97 to is inserted into a corresponding slot 98 in flap 96 forming latching arrangement 92 that can be of releasable construction. When this is done, both flaps 96, 97 overlie one another defining a handle 94 that is easy and convenient for a person to grasp to pick up the pan 20*d* in its closed condition to dispose of it.

FIGS. 1-18 also illustrate a number of preferred sifting arrangements formed of at least a plurality of pairs of perforations 52. For example, as is best shown in FIG. 8, the middle section defined between fold lines 40, 42 have a plurality of rows of perforations 52 with each row including a plurality of pairs of perforations 52. In addition, the bottom of each one of the pan halves 30, 32 has a plurality of rows of perforations 52 with each row having a plurality of pairs of perforations 52.

In one preferred embodiment, the perforations 52 in the middle section of the bottom 22 located between the fold lines 40, 42 has perforations 52 that are larger in size than the perforations in the bottom 22 of either pan half 30, 32 to facilitate more rapid egress of unused litter from the middle section when the pan halves 30, 32 are being folded to make folding easier while simultaneously minimizing the amount of unused litter that remains in the pan when it is in the fully closed condition.

In another preferred embodiment, such as is depicted in FIG. 10, only the middle section 33 of the pan bottom 22 is equipped with perforations 52. For example, in the embodiment shown in FIG. 10, the middle section 33 can have a plurality of rows or a plurality of pairs of rows of perforations formed therein with no perforations in either pan half 30, 32.

In a still further preferred embodiment, such as is depicted in FIG. 17, there can be a single row of perforations 52 formed in the middle section 33 of the bottom 22 along with at least one row of perforations 52 formed in the bottom 22 of at least one of the pan halves 30, 32. For example, in the pan 20*d* shown in FIG. 17, the bottom 22 of each pan halves 30, 32 have at least one row of perforations 52 formed therein. The middle section perforations 52 can be larger than the perforations 52 in either or both pan halves 30, 32 to further optimize flow of unused litter from the pan when being folded and closed.

With continued reference to FIG. 17, pan 20*d* illustrates a preferred sifting arrangement having a single row of perforations 52 extending centrally along the middle section 33 of the bottom 22 that is bracketed by a generally triangular arrangement of perforations 52 in the bottom 22 of each pan half 30, 32 with the apex or outermost perforation 52 closest to end wall 26 being generally centrally located relative to a longitudinal the extending centerline 104 that extends through end walls 26 as well as handle flaps 96, 102. As a result of being centrally disposed in this manner, flow of unused litter particulate matter as the pan is being folded up is maximized while excrement, including feces and clumped and/or used litter, is retained inside the closed pan.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

It is claimed:

1. A disposable litter pan arrangement comprising a litter pan formed of a litter-holding bottom wall with a fold region formed therein and a perforate litter sifting region disposed along the fold region; and a peel away film attached to an underside of the bottom wall covering the perforate litter sifting region preventing litter in the pan from passing through the litter sifting region and allowing unused litter to pass through the perforate litter sifting region when removed.

2. The disposable litter pan arrangement of claim 1 wherein the bottom wall has a pair of sides and a pair of ends, wherein the fold region is disposed intermediate the bottom wall ends dividing the pan into a plurality of folding pan sections, wherein the bottom wall is imperforate between the perforate litter sifting region and each bottom wall end, and wherein the perforate litter sifting region comprises a plurality of pairs of perforations covered by the peel away film attached to the underside of the bottom wall.

3. The disposable litter pan arrangement of claim 1 wherein the fold region comprises at least one fold line generally bisecting the bottom wall dividing the pan into a pair of folding pan halves that fold about the fold line.

4. The disposable litter pan arrangement of claim 3 wherein the fold region comprises a plurality of spaced apart generally parallel fold lines having a plurality of the perforations of the perforate litter sifting region disposed between the fold lines.

5. The disposable litter pan arrangement of claim 1 comprising a pre-packaged pan stack having a plurality of litter pans each formed of a litter-holding bottom wall with a fold region formed therein and a perforate litter sifting region comprised of a plurality of pairs of perforations disposed along the fold region, a peel away film attached to an underside of the bottom wall covering the perforations of the perforate litter sifting region allowing litter to pass through the perforations in sifting unused litter from fecal matter in the pan when removed, a charge of unused litter disposed in each one of the plurality of pans, and wherein one of the plurality of pans is nested in the other one of the plurality of pans.

6. A disposable litter pan arrangement comprising:
a pre-packaged pan stack having a plurality of litter pans each formed of a litter-holding bottom wall with a fold region formed therein and a perforate litter sifting region comprised of a plurality of pairs of perforations disposed along the fold region, a peel away film attached to an underside of the bottom wall covering the perforations of the perforate litter sifting region preventing litter in the pan from passing through the litter sifting region and allowing litter to pass through the perforations in sifting unused litter from fecal matter in the pan when removed, a charge of unused litter disposed in each one of the plurality of pans;

wherein one of the plurality of pans is nested in the other one of the plurality of pans; and wherein the amount of the charge of the unused litter in an upper one of the plurality of nested pans is greater than the amount of the charge of unused litter in a lower one of the plurality of nested pans underlying the upper one of the plurality of nested pans.

7. The disposable litter pan arrangement of claim 6 wherein a bottommost one of the pans of the pre-packaged pan stack has an imperforate bottom wall.

8. The disposable litter pan arrangement of claim 6 wherein each charge of unused litter comprises a clumping litter that includes one of a clay and cellulose.

9. The disposable litter pan arrangement of claim 6 wherein the fold region comprises at least one fold line generally bisecting the bottom wall dividing the pan into a pair of folding pan halves that fold about the fold line.

10. The disposable litter pan arrangement of claim 6 wherein the plurality of nested pans has a combined stack height so a cat sees the charge of unused litter in an uppermost one of the plurality of nested pans.

11. The disposable litter pan arrangement of claim 10 wherein the combined stack height of the pre-packaged pan stack has a height of about ten to twelve inches.

12. A disposable litter pan arrangement comprising a pre-packaged pan stack having a plurality of pans with each one of the plurality of pans including a litter-holding bottom wall having a litter sifting region comprised of a plurality of perforations and a fold region formed therein, a peel away film adhesively attached to an underside of the bottom wall covering the perforations preventing litter in the pan from passing through the perforations and allowing unused litter to pass through the perforations in sifting unused litter from clumped litter and fecal matter in the pan when manually removed, and a charge of unused litter disposed therein, and wherein one of the plurality of pans is nested in the other one of the plurality of pans.

13. The disposable litter pan arrangement of claim 12 wherein the amount of the charge of the unused litter in an upper one of the plurality of nested pans is greater than the amount of the charge of unused litter in a lower one of the plurality of nested pans underlying the upper one of the plurality of nested pans.

14. The disposable litter pan arrangement of claim 13 wherein each charge of unused litter comprises a clumping litter that includes one of a clay and cellulose.

15. The disposable litter pan arrangement of claim 12 wherein, for each one of a plurality of the pans, (a) the bottom wall has a pair of sides and a pair of ends, (b) the fold region is disposed intermediate the bottom wall ends dividing the pan into a plurality of folding pan sections, and (c) the bottom wall is imperforate between the litter sifting region and each bottom wall end.

16. The disposable litter pan arrangement of claim 12 wherein, for each one of a plurality of the pans, (a) the fold region comprises at least one fold line generally bisecting the bottom wall into a pair of folding pan halves that fold about the at least one fold line, and (b) the perforations of the litter sifting region extend along the at least one fold line.

17. The disposable litter pan arrangement of claim 12 wherein the fold region is defined by a pair of spaced apart and elongate fold lines formed in the bottom wall that generally bisect the bottom wall into a pair of halves that fold about the fold region toward one another and wherein the litter sifting region extends along the fold region.

18. A disposable litter pan arrangement comprising a pre-packaged pan stack having a plurality of pans with each one of the plurality of pans comprising (a) a litter-holding bottom wall having a fold region formed therein and a litter sifting region comprised of a plurality of pairs of perforations covered by a peel away film adhesively attached to an underside of the bottom wall covering the perforations of the litter sifting region and (b) a charge of unused litter disposed therein, wherein one of the plurality of pans is nested in the other one of the plurality of pans, wherein the amount of the charge of the unused litter in one of the plurality of nested pans is greater than the amount of the charge of unused litter in another one of the plurality of nested pans underlying the upper one of the plurality of nested pans, and wherein the peel away film allows unused litter to pass through perforations of the litter sifting region when peeled away.

19. The disposable litter pan arrangement of claim 18 wherein the amount of the charge of the unused litter in an upper one of the plurality of pans is greater than the amount of the charge of unused litter in a lower one of the plurality of pans underlying the upper one of the plurality of nested pans.

20. The disposable litter pan arrangement of claim 18 wherein, for each one of a plurality of the pans, (a) the bottom wall has a pair of sides and a pair of ends, (b) the fold region is disposed intermediate the bottom wall ends dividing the pan into a plurality of folding pan sections, and (c) the bottom wall is imperforate between the litter sifting region and each bottom wall end.

21. The disposable litter pan arrangement of claim 20 wherein, for each one of a plurality of the pans, (a) the fold region comprises at least one fold line generally bisecting the bottom wall into a pair of folding pan halves that fold about the fold line, (b) the perforations of the litter sifting region extend along the at least one fold line from adjacent one side of the bottom wall to adjacent the other side of the bottom wall, and (c) the bottom wall is imperforate from each bottom wall end to adjacent the fold region.

* * * * *